United States Patent
Elliott et al.

(10) Patent No.: US 9,404,063 B2
(45) Date of Patent: Aug. 2, 2016

(54) SYSTEM AND PROCESS FOR EFFICIENT SEPARATION OF BIOCRUDES AND WATER IN A HYDROTHERMAL LIQUEFACTION SYSTEM

(71) Applicants: BATTELLE MEMORIAL INSTITUTE, Richland, WA (US); GENIFUEL CORPORATION, Salt Lake City, UT (US)

(72) Inventors: Douglas C. Elliott, Richland, WA (US); Todd R. Hart, Kennewick, WA (US); Gary G. Neuenschwander, Burbank, WA (US); James R. Oyler, Salt Lake City, UT (US); Leslie J. Rotness, Jr., Kennewick, WA (US); Andrew J. Schmidt, Richland, WA (US); Alan H. Zacher, Pasco, WA (US)

(73) Assignees: Battelle Memorial Institute, Richland, WA (US); Genifuel Corporation, Salt Lake City, UT (US)

( * ) Notice: Subject to any disclaimer, the term of this patent is extended or adjusted under 35 U.S.C. 154(b) by 0 days.

(21) Appl. No.: 14/534,010

(22) Filed: Nov. 5, 2014

(65) Prior Publication Data
US 2015/0126758 A1 May 7, 2015

Related U.S. Application Data

(60) Provisional application No. 61/900,707, filed on Nov. 6, 2013.

(51) Int. Cl.
| | |
|---|---|
| C11B 1/14 | (2006.01) |
| C11B 3/00 | (2006.01) |
| C10G 33/06 | (2006.01) |
| C10G 3/00 | (2006.01) |
| B01J 19/18 | (2006.01) |
| B01J 19/24 | (2006.01) |

(52) U.S. Cl.
CPC ... *C11B 1/14* (2013.01); *C10G 3/40* (2013.01); *C10G 3/52* (2013.01); *C10G 33/06* (2013.01); *C11B 3/006* (2013.01); *C11B 3/008* (2013.01); *B01J 19/18* (2013.01); *B01J 19/24* (2013.01); *B01J 2219/24* (2013.01); *C10G 2300/1011* (2013.01); *Y02P 30/20* (2015.11)

(58) Field of Classification Search
None
See application file for complete search history.

(56) References Cited

U.S. PATENT DOCUMENTS

| | | | |
|---|---|---|---|
| 4,670,613 A | 6/1987 | Ruyter et al. | |
| 2005/0113611 A1 | 5/2005 | Adams et al. | |
| 2012/0023810 A1* | 2/2012 | Fjare | C10G 1/02 44/307 |

OTHER PUBLICATIONS

International Search Report/Written Opinion for International Application No. PCT/US2014/064260, International filing date Nov. 6, 2014, Date of Mailing Feb. 18, 2015.
Peterson, A. A., et al., Thermochemical biofuel production in hydrothermal media: A review of sub- and supercritical water technologies, Energy & Environmental Science, 1, 1, 2008, 32-65.
Elliott, D. C., et al., Process development for hydrothermal liquefaction of algae feedstocks in a continuous-flow reactor, Algal Research, 72, 2013, 1-10.

* cited by examiner

*Primary Examiner* — Yate K Cutliff
(74) *Attorney, Agent, or Firm* — Wells St. John P.S.

(57) ABSTRACT

A system and process are described for clean separation of biocrudes and water by-products from hydrothermal liquefaction (HTL) product mixtures of organic and biomass-containing feedstocks at elevated temperatures and pressures. Inorganic compound solids are removed prior to separation of biocrude and water by-product fractions to minimize formation of emulsions that impede separation. Separation may be performed at higher temperatures that reduce heat loss and need to cool product mixtures to ambient. The present invention thus achieves separation efficiencies not achieved in conventional HTL processing.

17 Claims, 5 Drawing Sheets

SYSTEM AND PROCESS FOR EFFICIENT SEPARATION OF BIOCRUDES AND WATER IN A HYDROTHERMAL LIQUEFACTION SYSTEM

CROSS REFERENCE TO RELATED APPLICATIONS

This is a non-provisional application that claims priority from U.S. Provisional Patent Application No. 61/900,707 filed 6 Nov. 2013, which reference is incorporated herein in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RLO-1830 awarded by the U.S. Department of Energy. The Government has certain rights in the invention.

FIELD OF THE INVENTION

The invention relates generally to hydrothermal systems and processes that convert organic matter and biomass sources to biocrudes, gases, and other components. More particularly, the invention relates to a system and process for efficient separation of biocrudes and water in hydrothermal liquefaction system.

BACKGROUND OF THE INVENTION

Hydrothermal liquefaction (HTL) is an aqueous processing system that employs a pressurized hot water reaction environment to thermochemically convert feedstocks containing organic materials and/or biomass into biocrudes. Yield and composition of the biocrude may vary based on the selected organic materials and/or biomass in the feedstock. Biomass may be derived from plants, algae (e.g., macroalgae and microalgae), photosynthetic cyanobacteria, animal wastes, food and liquid processing wastes (e.g., meat solids and dairy liquids), other biomass materials (e.g., wood), and combinations of these various sources. Organic materials and biomass may include constituents such as carbohydrates, proteins, cellulose, lipids, and lignin. Biomass may also include inorganic constituents that originate in the biomass sources and constituents introduced externally such as, e.g., dirt, sand, ash, salt water, and like materials. Conversion of wet biomass in aqueous slurries by HTL to liquid fuels has been studied in recent decades. Commercial-scale yields have yet to be achieved due to unresolved issues including, e.g., separation of resulting biocrudes from the water by-products; deoxygenation of biocrudes for use; and separation of insoluble inorganic solids from the HTL feedstocks during processing. For example, separating biocrudes in hydrothermal systems from water by-products is critical so that each phase may be processed separately or processed further into useful products. However, recovery of biocrudes in conventional HTL is presently inefficient due to the need for added solvents to extract the biocrudes from the water by-products and for other chemicals such as acids to adjust pH. However, chemicals used currently for processing can complicate downstream processing of the biocrudes and water by-products and have a detrimental effect on overall energy efficiency. In addition, complex emulsions can form between the biocrudes and water by-products during conventional processing that reduce recovery and yields. Accordingly, new systems and processes are needed that enhance the efficiency or effectiveness of separation of biocrudes and water by-products in the HTL process flowsheet. The present invention addresses these needs.

SUMMARY OF THE INVENTION

The present invention includes a system and process for efficient separation of biocrudes and water by-products from product mixtures obtained from hydrothermal liquefaction (HTL) processing. HTL converts a feedstock containing organic material and/or biomass in a water slurry to a product mixture containing the biocrude and water by-product. The term "biocrude" as used herein means a liquefaction product obtained from HTL processing at temperatures below the critical point of water (374° C. at a pressure of 22.1 MPa). Feedstock slurries may have a composition that permits the slurry to be pumped and/or fed through the HTL system.

The system may include a separation stage, e.g., for settling and removing insoluble inorganic compounds and/or mineral solids present in the HTL product mixture at a HTL process (first) temperature and pressure. Separation stage may include a filter that prevents passage of insoluble solids from the separation stage into the HTL product mixture released from the separation stage.

The system may include a cooling stage that cools the product mixture after removal of precipitated inorganic compounds and/or mineral solids to a second temperature selected below the first temperature and above ambient temperature at a second pressure that phase separates the biocrude in the HTL product mixture from the water by-product. The cooling stage may deliver the second temperature selected between about 200° C. to about 250° C. and the second pressure selected above about 20 bar ($2.0 \times 10^3$ kPa) to about 60 bar ($6.0 \times 10^3$ kPa).

The system may also include another separation stage such as an oil/water separator configured to separate the phase-separated biocrude and water by-product phases into individual fractions without a need for extraction solvents and without a further change in temperature and pressure.

The system may further including an upgrade stage configured to upgrade the separated biocrude fraction at a temperature selected up to about 450° C. and a hydrogen partial pressure selected up to about 152 bar ($1.52 \times 10^4$ kPa) to form a green crude.

The present invention also includes a process for conversion of feedstocks containing organic material and/or biomass into biocrudes and efficiently separating the biocrude from the water by-product in the product mixture. HTL process conditions may include selected times, temperatures, and pressures that provide chemical conversion of organic and biomass in the feedstocks, insolubility for divalent alkaline-earth salts, and solubility for alkali salts formed during processing.

The process may include liquefying the organic material and/or biomass in the feedstock at a first temperature and a first pressure in a reactor to form an HTL product mixture containing the biocrude and a water by-product. Reactors may include, but are not limited to, e.g., plug-flow reactors and continuous stirred tank reactors (CSTR). During liquefaction, the HTL feedstock may be stirred or mixed in the reactor at a velocity that prevents precipitated inorganic compounds and/or mineral solids from separating from the HTL product mixture.

In some embodiments, the HTL process (first) temperature may be between about 300° C. to about 370° C. First pressures may be between about 100 bar ($1.0 \times 10^4$ kPa) to about 210 bar ($2.10 \times 10^4$ kPa). Biopolymers in the feedstock readily decompose at temperatures greater than about 200° C.

In some embodiments, HTL processing may include a temperature of about 350° C. and a pressure of about 207 bar ($2.07 \times 10^4$ kPa).

In some embodiments, HTL processing pressures may be selected between about 100 bar ($1.0 \times 10^4$ kPa) to about 210 bar ($2.1 \times 10^4$ kPa).

In embodiments operated at near-critical temperatures, water may take on selected properties including, e.g., a low viscosity, a low polarity, a low surface tension, and a low density.

Precipitated inorganic compounds and/or mineral solids may include a divalent cation and an anion including, but not limited to, e.g., sulfate, phosphate, carbonate, and combinations of these anions.

The process may include removing precipitated inorganic compounds and/or mineral solids from the HTL feedstock and/or from the HTL product mixture at the HTL process (first) temperature and the HTL process (first) pressure in a separation vessel.

Removal of inorganic and/or mineral compounds may include filtering the HTL feedstock and/or the HTL product mixture to remove the insoluble solids.

Removal of precipitated inorganic compounds and/or mineral solids may be performed after liquefaction of the HTL feedstock and prior to separation of the biocrude and water by-product from the HTL product mixture into separate fractions.

Removal of precipitated inorganic compounds and/or mineral may be performed after heat-up to the HTL process (first) temperature and first pressure immediately prior to liquefaction of the HTL feedstock.

Removal of precipitated inorganic compounds and/or mineral solids may be performed in a separation vessel or a settling vessel.

Removal of precipitated inorganic compounds and/or mineral solids may include holding the HTL product mixture at a non-turbulent (quiescent) condition for a time sufficient to settle and accumulate the precipitated solids.

Removal of precipitated inorganic compounds and/or mineral solids may include growing particles of the precipitated solids in a quiescent condition to a size sufficient to settle and accumulate the particles prior to removal. Growth of the solid particles may include a dwell time in the quiescent condition of at least about 10 minutes or greater.

Precipitated inorganic compounds and/or mineral solids may be removed from the bottom of the settling vessel or the separation vessel.

Removal of inorganic and/or mineral compounds minimizes or prevents formation of emulsions between the biocrude and the water by-product upon cooling.

In some embodiments, removal of precipitated inorganic compounds and mineral solids from the feedstock and/or product mixture may be performed, e.g., by settling, and/or by filtration at a temperature below about 360° C. In some embodiments, removal of precipitated inorganic compounds and mineral solids may be performed at temperatures selected at or below about 350° C. In other embodiments, removal of precipitated inorganic compounds and/or mineral solids may be performed at temperatures between about 300° C. to below about 360° C. In yet other embodiments, removal of precipitated inorganic compounds and mineral solids may be performed at temperatures between about 200° C. to below about 360° C.

Residence times needed to effect settling of precipitated inorganic compound and mineral solids from the HTL feedstock or HTL product mixture in a separation vessel are not limited. Residence times may be selected that provide sufficient time for growth (e.g., Oswald Ripening) of insoluble crystal particles that permits settling (e.g., gravity settling), filtration, and removal of these inorganic and mineral solids from the HTL feedstocks and/or HTL product mixtures. In some embodiments, residence time in the separation vessel may be at least about 10 minutes.

With inorganic compounds and mineral solids removed, the HTL product mixture containing the biocrude and the water by-product may be cooled in a cooling device to a separation (second) temperature selected below the HTL process (first) temperature that is at or above ambient temperature to phase separate the biocrude from the water by-product (i.e., bring the biocrude out of the water by-product) in the HTL product mixture.

The process may also include separating the biocrude and the water by-product in the absence of an extraction solvent into separate biocrude and water by-product fractions without a further change in temperature and pressure. Separation of the biocrude in the product mixture from the water by-product may be cleanly achieved in a separation device such as an oil/water separator. Separation (second) temperatures may be below the HTL process (first) temperature at a second pressure that maintains the biocrude and the water by-product in a liquid state.

In some embodiments, separation (second) temperature may be at or below about 370° C.

In some embodiments, separation (second) temperature may be at or below about 300° C.

In some embodiments, separation temperature may be between about 225° C. to below about 370° C.

In some embodiments, separation (second) temperature may be selected between about 175° C. to about 275° C. at a second pressure above about 20 bar ($2.0 \times 10^3$ kPa) up to about 100 bar ($1.0 \times 10^4$ kPa).

In some embodiments, separation (second) temperature may be selected between about 200° C. to about 250° C. at a pressure above about 20 bar ($2.0 \times 10^3$ kPa) to about 60 bar ($6.0 \times 10^3$ kPa).

In some embodiments, separation (second) temperature may be about 225° C. at a pressure above about 50 bar ($5.0 \times 10^3$ kPa).

In some embodiments, separation (second) temperature may be selected between about 40° C. to about 90° C.

In some embodiments, separation (second) temperatures may be selected below the HTL process (first) temperature to minimize heat required to bring the temperature back to the HTL process temperature or to a greater temperature for subsequent or further processing of separated biocrude and water by-product fractions following separation.

Separated biocrude and water by-product fractions may be delivered to a subsequent processing stage or process for further processing at a temperature at or above the second temperature.

The purpose of the foregoing abstract is to enable the United States Patent and Trademark Office and the public generally, especially the scientists, engineers, and practitioners in the art who are not familiar with patent or legal terms or phraseology, to quickly determine from a cursory inspection the nature and essence of the technical disclosure of the application. The abstract is neither intended to define the invention of the application, which is measured by the claims, nor is it intended to be limiting as to the scope of the invention in any way. A more complete appreciation of the invention will be readily obtained by reference to the following description of the accompanying drawings in which like numerals in different figures represent the same structures or elements.

DETAILED DESCRIPTION OF THE PRESENT INVENTION

A hydrothermal liquefaction (HTL) system and process are described that provide effective separation of water from biocrudes resulting from conversion of organic and biomass feedstocks in process mixtures. The present invention includes temperatures, pressures, reaction times, equipment configurations and a process for effective separation of selected biocrude and water phases. The following description includes a best mode of the present invention. Preferred embodiments of the present invention will now be described. However, the invention is not intended to be limited thereto. For example, it will be apparent that various modifications, alterations, and substitutions to the present invention may be made. The invention is intended to cover all modifications, alternative constructions, and equivalents falling within the scope of the present invention as defined in the claims listed hereafter. Accordingly, the description of exemplary embodiments should be seen as illustrative only and not limiting.

Figure 1:
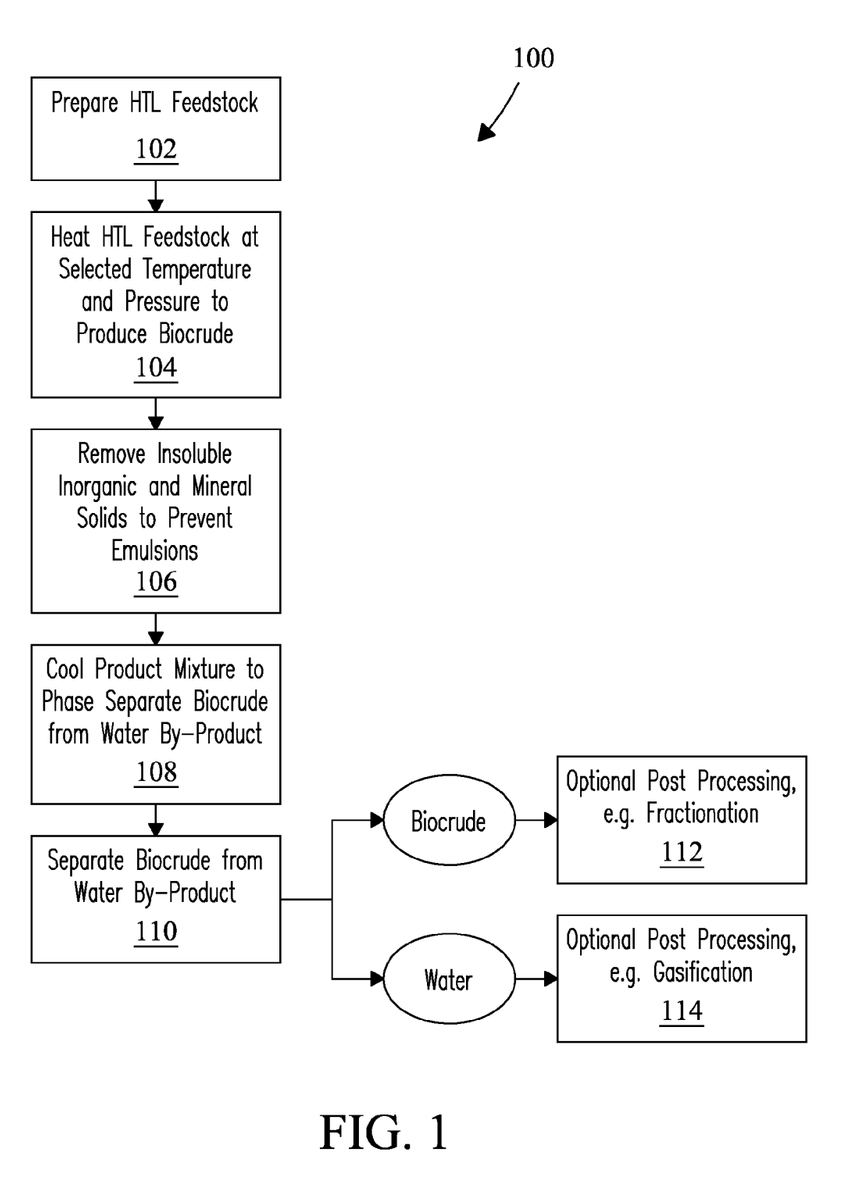
FIG. 1 shows an exemplary flowsheet for performing HTL of organic and biomass feedstocks in accordance with the present invention.

FIG. 1 shows an exemplary process 100 for Hydrothermal Liquefaction (HTL) processing of feedstocks containing organic material and/or biomass in accordance with the present invention. In one step {102}, the process may include preparing the HTL feedstock. The feedstock may include a selected quantity of dry organic material and/or biomass in a selected quantity or ratio of water. Organic materials and/or biomass in the feedstock may include, but are not limited to, e.g., food processing wastes, human and animals wastes, algae (e.g., micro-algae and macro-algae), and other source materials. Food processing wastes include, but are not limited to, e.g., trimmings, culls, pomace, cooking water, washings, fermentation residuals, and like materials including combinations of these various materials. In some embodiments, raw materials such as fruits, vegetables, fish, poultry, livestock, and combinations of these raw materials may be employed as feedstock materials. Other biomass materials (e.g., wood) may also be employed. Organic materials and biomass may include constituents such as carbohydrates, proteins, cellulose, lipids, and lignin. All suitable sources of organic materials and/or biomass may be employed. No limitations are intended. HTL feedstocks may take various forms. In some embodiments, the feedstock may take the form of a slurry.

In various embodiments, dry organic material and/or biomass in the feedstock may include a mass percentage of from about 5% to about 40%. In some embodiments, dry organic material and/or biomass may include a mass percentage of from about 15% to about 35%. In some embodiments, quantity of organic material and/or biomass may be about 15% to about 20% by weight, but quantities are not intended to be limited. Quantity selected for the feedstock depends in part on the composition and properties of the dry organic material and/or biomass. In some embodiments, quantity of water in the feedstock may include a mass percentage of from about 60% to about 95% by weight. In some embodiments, quantity of water in the feedstock may include a mass percentage from about 80% to 85% by weight.

In another step {104}, the HTL feedstock may be heated at selected temperatures and pressures to liquefy the organic material and or biomass in the feedstock that forms an HTL product mixture containing a biocrude and water by-product. Temperatures may be selected at or below near-critical water conditions. By controlling pH, chemical liquefaction reactions may be favored, recombination of biopolymers can be minimized, solid char particles stemming from decomposition of biopolymer fragments can be avoided, and yield of biocrude can be maximized. The water by-product may contain residual organics.

In another step {106}, insoluble inorganic compounds and mineral solids and "tramp" solids such as sand and dirt present in the HTL feedstock and/or HTL product mixture may be removed e.g., by settling, by filtration, or by other separation methods. Insoluble inorganic compounds and/or mineral solids may stem from trace elements and minerals found in the original organic material and/or biomass sources, and from external sources (e.g., dirt, sand, salts from salt water, etc.) during gathering or harvesting of the biomass. For example, salts present in sea water may be found in algal biomass harvested from marine algae. And, wind-blown dust may be present in forest product residuals. And, dirt may be present in recovered sources of cornstover. Biomass may contain a mineral content and/or ash content as high as about 50% on a dry mass basis.

Upon decomposition of the feedstock materials, elements like calcium, magnesium, sodium, and potassium held in various organic and/or biomass structures may be freed into the product mixture or product stream. Anions such as sulfate, phosphate, carbonate, and combinations of these anions may also be freed upon decomposition of biopolymers and biomass materials that become available to react. Inorganic compounds formed in the HTL product mixture may include various mineral phases, and alkaline-earth salts of calcium and magnesium such as, e.g., phosphates, sulfates, and carbonates.

Presence of insoluble inorganic compounds and/or mineral solids in the HTL feedstock or HTL product mixture can adversely affect downstream separation of the biocrude and water by-products if allowed to remain. For example, if insoluble inorganic compounds remain suspended in the HTL feedstock and/or HTL product mixture, emulsions can form when the HTL product mixture containing biocrude and the water by-product is cooled below HTL process conditions and water regains its polar structure. Emulsions can be difficult or costly to separate or can otherwise decrease the effectiveness of downstream separation of the biocrude and water by-product from the product mixture. Inorganic sulfur and phosphorus compounds suspended in the water feedstock can also deactivate catalysts employed for downstream processing including, e.g., catalytic hydrothermal gasification (CHG).

The present invention removes these insoluble solids which minimizes formation of emulsions during subsequent separation of the HTL biocrude from the water by-product. In the exemplary embodiment, the HTL product mixture containing the biocrude and water by-product may be subjected to a temperature and pressure such as, e.g., 350° C. and 207 bar ($2.07 \times 10^4$ kPa) to precipitate the inorganic compounds. Removal of inorganic and mineral solids from the HTL feedstock and/or product mixture minimizes or prevents formation of emulsions between the biocrude and water by-product in the HTL product mixture. Inorganic compounds formed in the HTL product mixture may be precipitated and subsequently removed from the product mixture. Precipitation of inorganic and mineral solids can occur in the HTL feedstock during heat up to HTL conditions or during liquefaction. Removal of precipitated solids can be performed, e.g., in a separation or settling vessel as described further herein. Precipitated solids may be removed at any time prior to separation of the biocrude and water by-product phases into separate fractions.

In another step {108}, with inorganic solids now removed from the HTL product mixture, the product mixture may be cooled to a temperature and a pressure that phase separates the biocrude from the water by-product in the product mixture. In some embodiments, separation temperature may be at or below about 300° C. In some embodiments, separation temperature may be at or above about 225° C. Temperatures are preferred that minimize the reheating required for subsequent processing of the biocrude and water by-product following separation in a post-separation processing stage.

In another step {110}, the phase separated biocrude may be effectively separated from the water by-product into individual biocrude and water fractions.

In another step {112}, the separated biocrude fraction and water by-product fraction containing residual organics may be processed further.

In various embodiments, separated biocrude and water fractions may be reheated for further post-separation processing.

Post-processing of the biocrude may include, but is not limited to, e.g., hydrogenation to remove heteroatoms, fractionation, distillation, isomerization, cracking, including combinations of these processes.

Post-processing of the water fraction may include, but is not limited to, e.g., removing water to concentrate residual organics, removing residual organics or other chemical compounds, gasifying residual organics (e.g., by CHG) into natural gas or other gaseous products, recovering residual biocrude and organic materials, including combinations of these processes. Post processing of biocrude fractions and water by-product fractions may be performed separately, serially, or simultaneously.

By minimizing or eliminating emulsions during processing, hydrothermal processing of various organic materials and biomass performed in accordance with the present invention provides clean separation of biocrudes and water by-products, provides valuable yields of biocrudes, natural gas, or both biocrudes and natural gas at a high efficiency.

Figure 2:
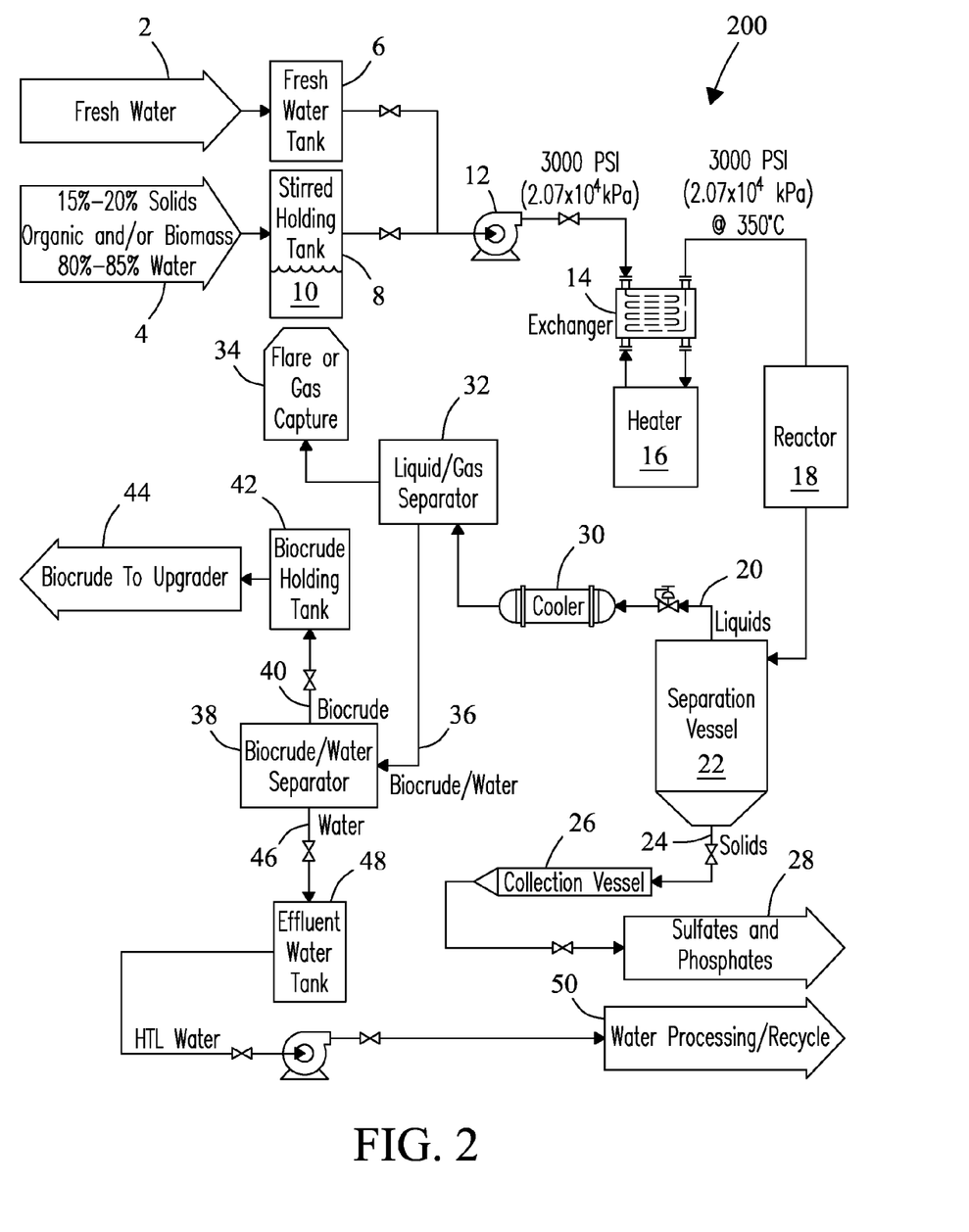
FIG. 2 is a block diagram of an exemplary HTL system according to one embodiment of the present invention.

FIG. 2 is a block flow diagram showing an exemplary HTL system 200 of the present invention for conversion of HTL feedstocks containing organic materials and/or biomass into biocrudes. The present invention minimizes or prevents formation of emulsions between the biocrude and water by-products in the product mixture that addresses a known problem in conventional hydrothermal processing. The present invention also provides for efficient separation of the biocrude from the water by-product in the product mixture into individual fractions for further processing.

System 200 may include a holding tank 8 such as a stirred holding tank 8 or other containment vessel that holds an HTL feedstock 10 containing a selected quantity of an organic material and/or biomass 4 (e.g., 15% to 20% by weight) mixed with a selected quantity of water 2 (e.g., 80% to 85% by weight). Various types and quantities of organic material and/or biomass in the feedstock may be processed into biocrudes. No limitations are intended. A water tank 6 may deliver fresh water 2 to maintain a selected flow, viscosity, and/or density of the feedstock through HTL system 200. HTL feedstock 10 may be delivered with, e.g., a high-pressure pump 12 into a heating stage (heater) 16 at selected pressures. In the exemplary embodiment, heater 16 may include a hot oil exchanger 14 that supplies heat energy to heat the feedstock at the operation temperature for conversion into biocrude during processing. Heat that heats the feedstock may be recovered elsewhere in the system (a process termed "heat integration"), e.g., from heat exchangers during temperature drops from the HTL process (first) temperature to separation (second) temperatures described further herein. Devices and components from which heat may be recovered from and/or heat supplied to are not limited. Heat integration enhances efficiency in the system.

HTL processing may be performed with super-heated (i.e., subcritical) water at temperatures above 100° C. and below the supercritical temperature of 374° C. In some embodiments, temperatures between about 300° C. and about 360° C. may be employed. In operation, pressures may be selected that maintain some quantity of liquid water in the feedstock during processing. In the figure, an exemplary pressure of 3000 psi [207 bar ($2.07 \times 10^4$ kPa)] is illustrated, but pressures are not intended to be limited. Feedstock 10 may be circulated and liquefied at selected HTL operation temperatures and pressures in an HTL reactor 18 that ensures heat is transferred through the feedstock (e.g., by mixing) for conversion of the organic material and/or biomass therein into biocrude during processing. Reactors may be employed that provide a sufficient velocity or turbulence for mixing the HTL feedstocks during operation. Reactors may include, but are not limited to, e.g., plug-flow reactors and continuous stirred-tank reactors (CSTR). In some embodiments, turbulence-induction reactors may be employed that provide a turbulence, e.g., at Reynold's Number (NR) values greater than about 2100.

In some feedstocks, some precipitation of insoluble inorganic compounds and/or mineral solids may occur prior to liquefaction, e.g., during heat up to the HTL process temperature. Insoluble inorganic compounds and/or mineral solids may also precipitate during liquefaction. In some embodiments, precipitated inorganic compounds and/or mineral solids 24 may be removed from the HTL feedstock prior to liquefaction, and/or following liquefaction but prior to separation of the biocrude from the water by-product.

In the exemplary embodiment, the HTL product mixture 20 containing the biocrude may be delivered to a separation vessel 22, a settling vessel, or other non-turbulent (quiescent) vessel for a time sufficient to provide settling of precipitated inorganic compounds and/or mineral solids 24 for removal. Residence times in separation vessel 22 may be selected to provide growth (e.g., Oswald Ripening) of the precipitated solid particles to a size or a distribution of sizes sufficient for settling (e.g., gravity settling) and/or filtration. In some embodiments, residence time in settling vessel for growth of particles may be at least about 10 minutes on average.

Separation (settling) vessel 22 may include a filter (not shown) that minimizes or prevents release of inorganic and mineral solids from separation vessel 22. Liquid HTL product mixture 20 exits separation vessel 22 through the filter with inorganic and/or mineral solids removed. The filter may be an integrated filter or a replaceable filter. The filter may include a screen size at or below about 10 microns. Removal of insoluble inorganic and/or mineral solids from the HTL product mixture minimizes or prevents formation of emulsions during subsequent cooling and pressure let-down. The filter may also prevent insoluble solids from being entrained in the exit stream at higher superficial velocities in settling vessel 22.

In some embodiments, settled and accumulated inorganic compounds and/or mineral solids 24 may be removed, e.g., from the bottom of separation vessel 22 at temperatures selected at or below 350° C. and pressures at or below about 207 bar ($2.07 \times 10^4$ kPa). Conditions are not limited provided some liquid water remains in the vessel sufficient for separation. Accumulated solids 24 may be collected in a collection vessel 26 such as a blow-down pot.

In some embodiments, mineral-rich inorganic solids recovered from the HTL product mixture may include sulfates and phosphates 28 that may be used as nutrients for growth of additional biomass solids, algal feedstocks, and/or for other suitable uses and applications. No limitations are intended.

Elimination of emulsions increases the efficiency of separation of the biocrude 40 and water by-product 46 downstream of separation vessel 22. For example, with inorganic solids 24 removed, greater than about 99% of the available biocrude 40 may be recovered. In some embodiments, water entrained in the biocrude may be less than about 10%. In some embodiments, water entrained in the biocrude may be less than about 1%.

With inorganic solids removed, the HTL product mixture 20 containing the biocrude and water by-product may be delivered through a cooling device 30 such as a heat exchanger and delivered to a liquid/gas separator 32. Cooling device 30 may cool the HTL product mixture 20 to a separation (second) temperature below the HTL process temperature and a second pressure lower than the HTL (first) pressure.

In some embodiments, separation (second) temperatures may be selected above ambient temperature and below the HTL process (first) temperature.

In some embodiments, separation (second) temperatures may be selected below about 300° C. In some embodiments, separation (second) temperatures may be selected between about 200° C. to about 250° C. In some embodiments, separation (second) temperatures may be at or below about 225° C. In some embodiments, separation can be performed at a lower temperature including, e.g., 80° C.

In general, highest temperatures are preferred that achieve desired separation of the biocrude 40 and the water by-product 46 that also minimize reheating needed for further processing of separated biocrude and water by-product fractions. Pressures at first and second temperatures may be selected above the vapor pressure of water so that some quantity of water remains in the liquid state during processing.

Liquid/gas separator 32 may release gas (i.e., "pressure let-down") over the product mixture which may be recovered, e.g., in a gas capture stage 34 for further processing. Separator 32 may be a gravity device, a hydrocyclone device, or other separation device. No limitations are intended.

With gas over the product mixture 20 recovered or released, and insoluble inorganic and/or mineral solids removed, the HTL product mixture 36 containing the biocrude and water by-product may be delivered from the gas/liquid separator 32 at the lower temperature to an oil/water separator 38 that cleanly separates the biocrude 40 and water by-product 46 into separate fractions. At the lower temperatures, biocrude 40 may phase separate from the water by-product 46, which aides separation of biocrude and the water by-product in the separator 38. In the absence of emulsions, separation-temperatures may be selected that provide efficient and substantially complete separation of the biocrude 40 from the water by-product 46. Separation temperatures are preferred that provide effective separation of the biocrude 40 from the water by-product 46 and are as high as possible to minimize the amount of reheating needed to bring temperatures back to the HTL process temperature or a greater temperature for subsequent processing of the biocrude 40 and/or water 46 fractions in a post-processing stage. In cases where no immediate further processing of the separated fractions is intended, lower separation temperatures may be employed.

All temperatures as will be selected by those of ordinary skill in the art in view of the disclosure are within the scope of the present invention. No limitations are intended.

Separated biocrude 40 may be collected, e.g., in a biocrude holding tank 42 or other collection vessel for subsequent post-separation processing. Post-processing stages 44 for the biocrude may include, but are not limited to, e.g., hydrogenation stages that remove heteroatoms, fractionation stages, distillation stages, isomerization stages, cracking stages, including combinations of these various stages.

The separated water by-product 46 fraction may be collected, e.g., in an effluent water tank 48 or other collection vessel for subsequent post-separation processing. Post-processing stages 50 for the water fraction may include, but are not limited to, e.g., stages that remove water to concentrate residual organics, stages that remove residual organics or other chemical compounds, anaerobic digestion stages, stages that provide gasification of residual organics (e.g., by CHG) into natural gas or other gaseous products, including combinations of these various stages. However, stages and processes are not intended to be limited. For example, additional components may be added for accomplishing selected results without departing from the spirit and scope of the invention. No limitations are intended.

Inorganic Compound Solubility

Figure 3:
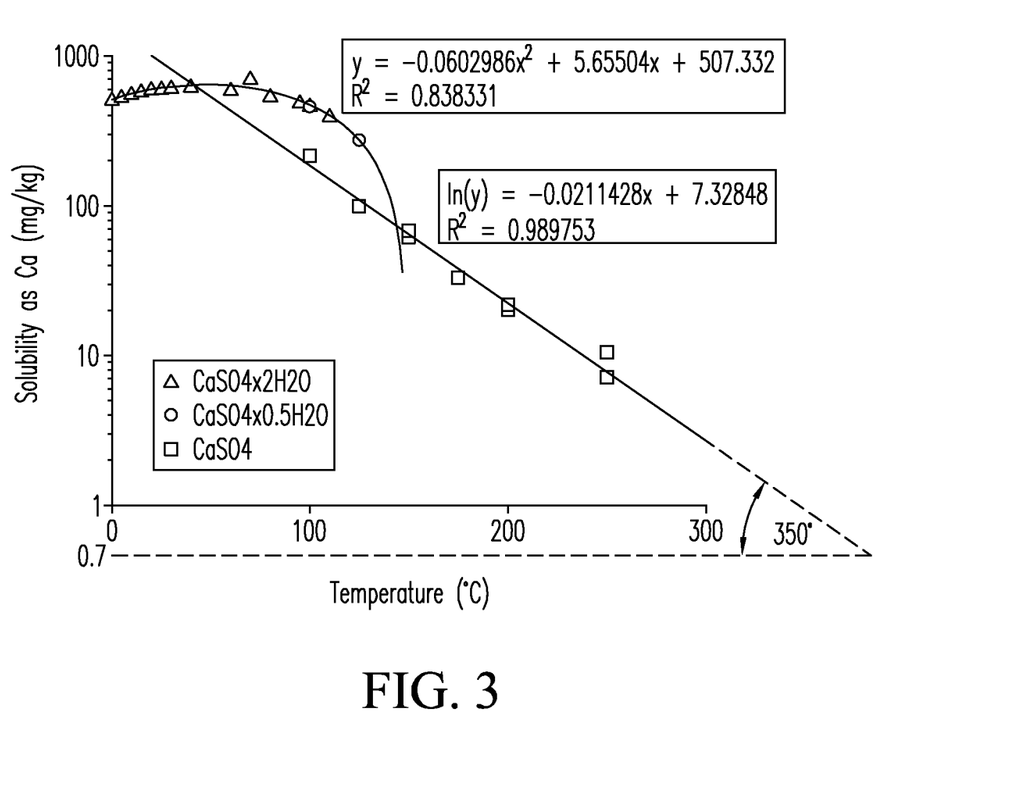
FIG. 3 is a plot showing solubility of calcium sulfate in water as a function of temperature.

FIG. 3 plots solubility of calcium sulfate, a representative divalent calcium salt, in water as a function of temperature. HTL process conditions may be selected so that monovalent salts such as sodium chloride remain in the water phase of the product mixture and do not precipitate. HTL process conditions may also be selected to minimize solubility of divalent salts so that they precipitate and can be recovered. As shown in the figure, calcium salts may be soluble at standard temperature and pressure but become insoluble at hydrothermal temperature and pressure conditions. In an exemplary embodiment, a process temperature at or below 350° C. and a pressure of about 207 bar ($2.07 \times 10^4$ kPa) may be selected to precipitate and separate the inorganic compound solids. At selected process conditions, precipitation of inorganic salts is rapid because of the insolubility of these salts. In general, inorganic compound solids have a solubility of less than about 1 mg/kg at selected HTL conditions and can therefore be easily separated (e.g., by precipitation) from the biocrude and water phases. Sufficient calcium may be introduced in the feedstock to form insoluble precipitates, e.g., as described by Elliott et al. in U.S. Pat. No. 8,241,605 incorporated herein in its entirety.

Calcium phosphate [Ca$_3$(PO$_4$)$_2$], another insoluble divalent salt, may also be recovered and recycled, e.g., for use as a phosphate nutrient in the production of algae used in HTL algal feedstocks. Aqueous and solid by-products recovered from HTL may also provide nutrients such as phosphorous (P) and nitrogen (N) that can be recycled for use in the algae growth medium. All insoluble salts as will be recovered and used by those of ordinary sill in the art are within the scope of the present invention. No limitations are intended.

Oxygen Content

Biocrudes of the present invention have a lower polarity than fast pyrolysis bio-oils and are also less hydrophilic due to a lower oxygen content. Lower oxygen content allows the biocrude in the product mixture to separate from the water by-product when the product mixture is cooled. In some embodiments, oxygen content is less than about 15% on average compared to 40% for fast pyrolysis bio-oils. In some embodiments, oxygen content is below 10%. In some embodiments, oxygen content is less than 5%. However, no limitations are intended.

Biocrude Solubility

The present invention provides separation of the biocrude from the water by-product at a high efficiency not achieved with conventional HTL. Separation of the biocrude and water by-product proceeds without need for conventional solvent extraction, acidification, or batch holding systems. With inorganic solids removed, the biocrude and the water by-product do not easily form emulsions at temperatures below the HTL process temperature. Thus, essentially complete separation of the biocrude and water by-product can be achieved by selecting a separation (second) temperature below the HTL process (first) where the biocrude is significantly less soluble in the water.

Figure 4:
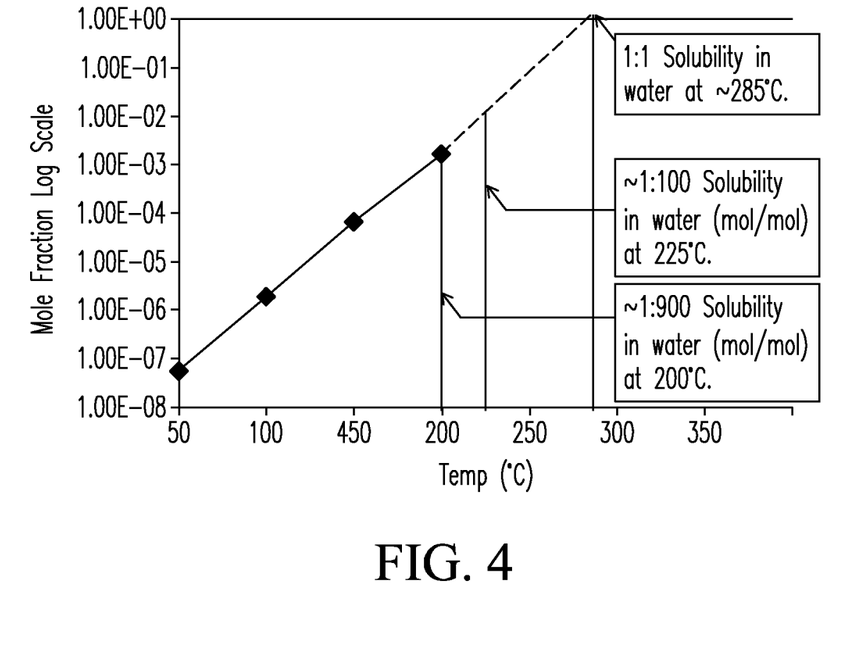
FIG. 4 shows the solubility of an exemplary polyaromatic hydrocarbon (PAH) in water as a function of temperature that is representative of organic compounds found in biocrudes.

FIG. 4 is a plot showing solubility of chloroanthonil, an exemplary polyaromatic hydrocarbon (PAH) representative of organic compounds found in biocrudes, in water as a function of temperature. At HTL process (first) temperatures between about 350° C. to about 360° C., biocrude components are primarily in solution. Chloroanthonil shows a solubility in water of about 1:1 [PAH:water] at a temperature at or above about 285° C. Solubility of biocrudes decreases as temperature is lowered below 300° C. Data for chloroanthonil shows a solubility in water of about 1:100 [PAH:water] at 225° C. A solubility in water of about 1:900 [PAH:water] is reached at about 200° C.

Figure 5:
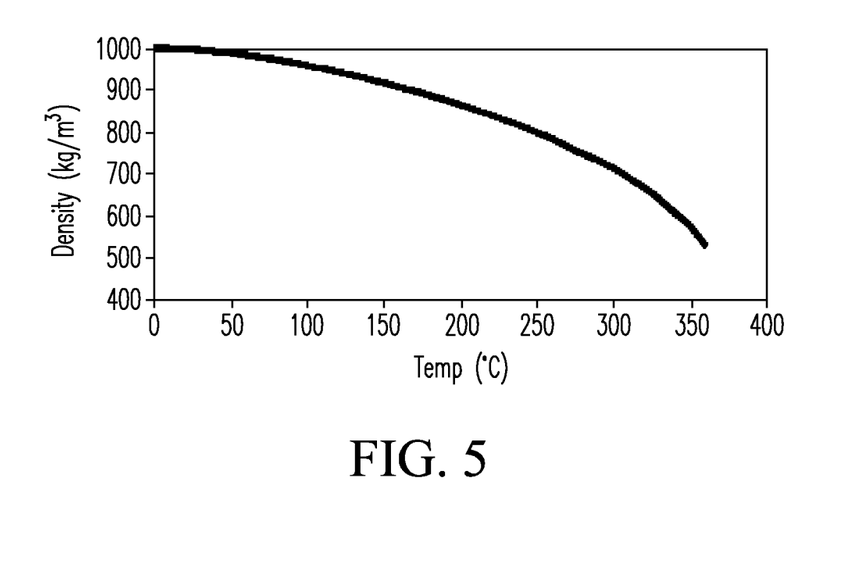
FIG. 5 is a plot showing density of water as a function of temperature.
Figure 6:
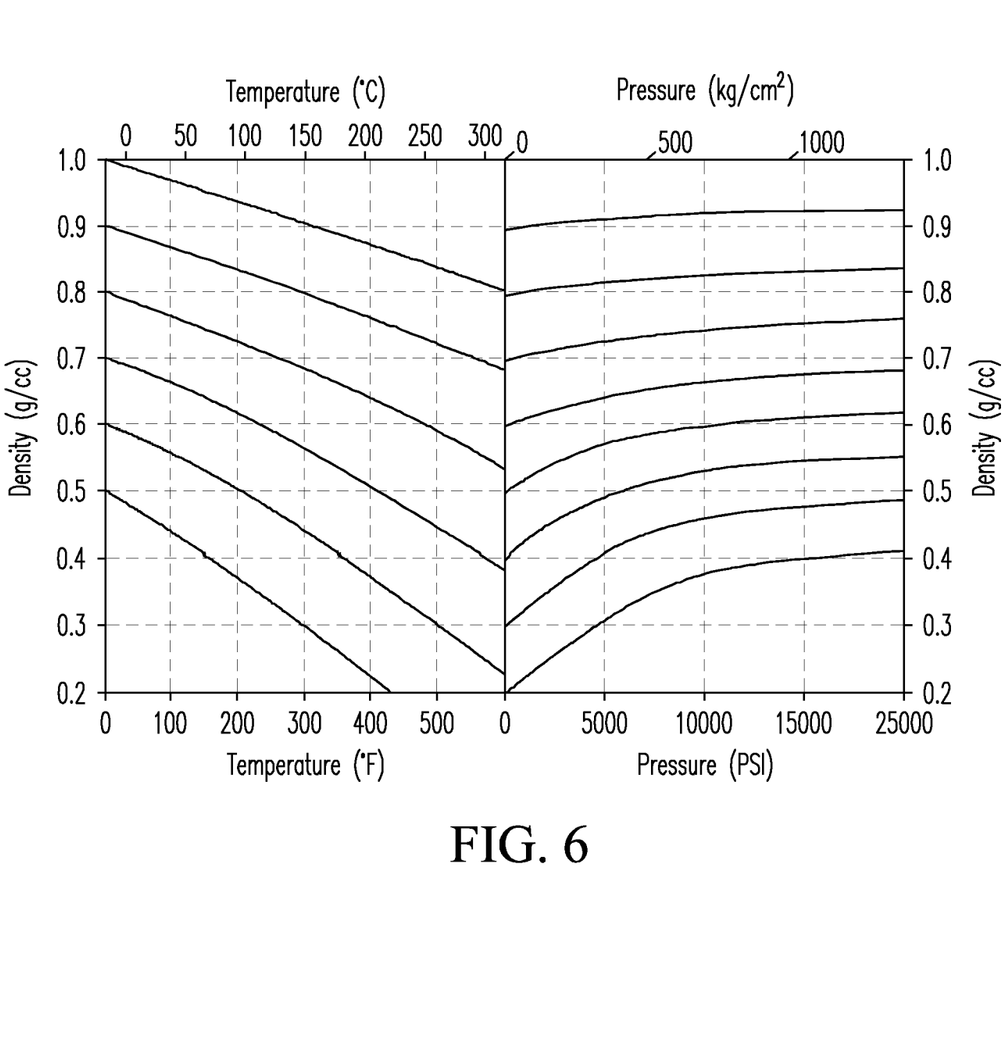
FIG. 6 is a plot showing density of a typical fossil crude oil as a function of temperature and pressure.

FIG. 5 plots density of water as a function of temperature. FIG. 6 plots density of a typical fossil crude oil as a function of temperature and pressure. HTL biocrudes obtained and processed in accordance with the present invention may exhibit similar densities as fossil crudes. As shown in the figure for fossil crudes, temperature and pressures for biocrudes may be offset based on starting density values.

Data in the figures show that temperatures (i.e., second temperatures) and pressures may be chosen such that density of the biocrude is sufficiently different from the density of the water by-product to allow rapid and/or clean separation of the biocrude from the water by-product into individual fractions.

In general, the greater the difference in density between the biocrude and the water by-product, the more rapid the phase separation and the better the recovery of the individual fractions during separation. In some embodiments, density difference between the biocrude and the water by-product phases may be at least about 0.03 g/cc or greater. In some embodiments, density difference between the two phases may be at least about 5%.

Process Efficiencies

In some embodiments, the present invention separates biocrudes in HTL product mixtures from water by-products at higher separation temperatures without a cooling step, which provides process (energy) efficiencies of at least about 85%. Less heat is lost than occurs in conventional separation that employs full cooling and subsequent reheating. For example, operation of the separation stage at a temperature and pressure similar to a subsequent post-separation processing stage can reduce need for re-heating and/or re-pressurization of the separated biocrude and water by-product fractions for post-separation processing.

In addition, gasification of residual organics in the water by-product can also maximize overall efficiency of biomass conversion in hydrothermal liquefaction processing performed in accordance with the present invention. For example, up to 10% of the energy produced from biocrude or gas can be used for operation.

Further, removal of insoluble inorganic and/or mineral solids from the HTL product provides a significant advantage. For example, heat exchangers that provide preheating of HTL feedstocks will not foul due to settling and/or coating of heat transfer surfaces by inorganic particulates.

Efficiencies of the present invention may be achieved, e.g., with temperature optimization and heat integration described herein.

Post Processing

Separated biocrude and water by-product fractions may be processed further in a subsequent processing stage.

Post-processing of the separated biocrude may include stages and processes including, but not limited to, e.g., hydrogenation to remove heteroatoms, fractionation, distillation, isomerization, cracking, including combinations of these various stages and processes.

In some embodiments, post processing of the separated water by-product fraction may include recycling the water by-product back into the feedstock. Post processing of the water fraction may also include stages and processes including, but not limited to, e.g., concentration to remove free water, concentration of residual organics, removal of residual organics, removal of other chemical compounds, recovering residual biocrude and organic materials, including combinations of these various stages and processes. Post processing of biocrude fractions and water by-product fractions may be performed separately, serially, or simultaneously.

In some embodiments, separated fractions may be maintained at the separation temperature, further cooled, or reheated for further processing.

In some embodiments, separated biocrude and water by-product fractions may be returned to ambient temperature and pressure without further processing.

In some embodiments, the separated water by-product containing residual organics may be submitted to a catalytic hydrothermal gasification (CHG) stage that converts the residual organics into natural gas or other gaseous products.

The following example provides a further understanding of the present invention.

Example 1

Hydrothermal Liquefaction of Food Processing Waste with Subsequent Catalytic Hydrothermal Gasification of Effluent Water Waste material from a food processing factory may be collected and macerated to form a slurry containing approximately 25% solids (dry basis) in water. The slurry may be pumped to a pressure of about 207 bar (2.07×10⁴ kPa) by a high-pressure slurry pump, and then sent to a heat exchanger. The heat exchanger may be configured to recover heat from the output stream. A hot-oil heater (e.g., fired by natural gas) may be used to provide finishing heat. In some embodiments, output temperature of the slurry may be about 350° C. The hot pressurized slurry may be flowed to a reactor such as a continuous stirred-tank reactor (CSTR) or a tubular (e.g., plug-flow) reactor. In some embodiments, feedstock slurry may be mixed continuously in the liquefaction reactor for a time of approximately 30 minutes. Organic materials including lipids, proteins, and carbohydrates may be broken down and liquefied by the hot pressurized water into a biocrude. The biocrude and water by-product in the HTL product mixture may be delivered from the reactor into a settling vessel where the product mixture may be held in a non-turbulent (quiescent) condition for a residence time sufficient to increase the size or size distribution (e.g., through Oswald Ripening) of precipitated particle solids. Hold time may vary depending on feedstock composition and particulates that are formed.

Inorganic solids may be filtered prior to release from the settling vessel to prevent passage of precipitated inorganic and/or mineral solids into the liquid HTL product mixture released from the settling stage. In some embodiments, the filter element may include a screen size at or below about 10 microns. In some embodiments, the filter element may include a filter rating of, e.g., 98% removal at 5 μm (98%). In some embodiments, the filter element may include a filter rating of, e.g., 100% removal at 18 μm.

Inorganic solids may be collected from the bottom of the settling vessel for removal from the system.

Process temperature and pressure may be maintained in the precipitation vessel. The biocrude and water product mixture with inorganic solids removed may then be cooled to 225° C. at a constant pressure of 207 bar (2.07×10⁴ kPa) and passed to a biocrude/water separator. At the lower temperature, water may return to a more polar state such that the biocrude now with a different density than the water can be separated from the product mixture.

In this example, both biocrude and water may include a low viscosity at this temperature (e.g., less than 4 centistokes), separation may be rapid using, e.g., a gravity-type separator. Biocrude may be collected for shipment to a refinery for processing into a finished fuel.

In some embodiments, 45% to 50% of the feedstock by mass may be converted into biocrude. Remaining organic content in the water by-product may be collected as a separate phase from the separator. Water that contains residual organics may be reheated to the original hydrothermal processing condition and converted over a fixed-bed catalyst into natural gas via CHG.

While exemplary embodiments of the present invention have been described herein, it is to be distinctly understood that this invention is not limited thereto but may be variously embodied to practice within the scope of the following claims. It will be apparent to those skilled in the art that many changes and modifications may be made without departing from the invention in its true scope and broader aspects. The appended claims are therefore intended to cover all such changes and modifications as fall within the scope of the invention.

What is claimed is:

1. A method for processing a hydrothermal liquefaction (HTL) product mixture derived from an HTL feedstock, the method separating a biocrude from a water by-product present in a hydrothermal liquefaction (HTL) product mixture and including:
    removing precipitated inorganic compounds and/or mineral solids present in the HTL product mixture at a first temperature and a first pressure;
    after removing the precipitated inorganic compounds and/or mineral solids, cooling the HTL product mixture to a second temperature selected below the first temperature to phase separate the biocrude from the water by-product in the HTL product mixture; and
    separating the biocrude and the water by-product phases in the absence of an extraction solvent into separate biocrude and water by-product fractions without a further change in temperature and pressure.

2. The method of claim 1, wherein the first temperature is between about 300° C. and 370° C. and the first pressure is between about 100 bar (1.00×10⁴ kPa) and 210 bar (2.10×10⁴ kPa).

3. The method of claim 1, wherein the first temperature is about 350° C. and the first pressure is about 207 bar (2.07×10⁴ kPa).

4. The method of claim 1, wherein the second temperature is between about 175° C. and about 275° C. and the second pressure is above about 20 bar (2.0×10³ kPa) up to about 100 bar (1.00×10⁴ kPa).

5. The method of claim 1, wherein the second temperature is up to about 250° C. and the second pressure is up to about 60 bar (6.0×10³ kPa).

6. The method of claim 1, wherein the second temperature is selected between about 40° C. to about 90° C.

7. The method of claim 1, wherein removal of the precipitated inorganic compounds and/or mineral solids from the HTL product mixture includes settling and accumulating the precipitated solids.

8. The method of claim 1, wherein removal of the precipitated inorganic compounds and/or mineral solids is performed in a separation vessel or settling vessel.

9. The method of claim 1, wherein removal of the precipitated inorganic compounds and/or mineral solids is performed after heat-up to the first temperature and first pressure and after liquefaction of the HTL feedstock.

10. The method of claim 1, wherein removal of the precipitated inorganic compounds and/or mineral solids is performed after liquefaction of the HTL feedstock prior to separation of the biocrude and water by-product from the HTL product mixture into separate fractions.

11. The method of claim 1, wherein removal of the precipitated inorganic compounds and/or mineral solids includes holding the HTL product mixture at a non-turbulent (quiescent) condition for a time sufficient to settle and accumulate the precipitated solids.

12. The method of claim 1, wherein removal of the precipitated inorganic compounds and/or mineral solids includes growing particles of the solids in a quiescent condition to a size sufficient to settle and accumulate the particles prior to removal thereof.

13. The method of claim 12, wherein growth of the solid particles includes a dwell time in the quiescent condition of at least about 10 minutes or greater.

14. The method of claim 1, wherein removal of the precipitated inorganic compounds and/or mineral solids includes settling and accumulating the solids in a settling vessel or a separation vessel.

15. The method of claim 14, wherein removal of the precipitated inorganic compounds and/or mineral solids includes separation of the precipitated inorganic compounds and/or mineral solids from the bottom of the settling vessel or the separation vessel.

16. The method of claim 1, wherein the precipitated inorganic compounds and/or mineral solids include a divalent cation and an anion selected from the group consisting of: sulfate, phosphate, carbonate, and combinations thereof.

17. The method of claim 1, further including delivering one or both of the separated biocrude and water by-product fractions to a subsequent processing stage or process for further processing at a temperature at or above the second temperature.

* * * * *